United States Patent
Cybulsky et al.

(10) Patent No.: US 8,124,252 B2
(45) Date of Patent: Feb. 28, 2012

(54) ABRADABLE LAYER INCLUDING A RARE EARTH SILICATE

(75) Inventors: Michael Cybulsky, Indianapolis, IN (US); Kang N. Lee, Zionsville, IN (US); Raymond J. Sinatra, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 12/624,938

(22) Filed: Nov. 24, 2009

(65) Prior Publication Data
US 2010/0129636 A1 May 27, 2010

Related U.S. Application Data

(60) Provisional application No. 61/117,797, filed on Nov. 25, 2008.

(51) Int. Cl.
- B32B 3/26 (2006.01)
- B32B 5/14 (2006.01)
- B32B 9/00 (2006.01)
- B32B 9/04 (2006.01)
- B32B 13/04 (2006.01)
- B32B 19/00 (2006.01)

(52) U.S. Cl. .................. 428/701; 428/304.4; 428/310.5; 428/446; 428/702

(58) Field of Classification Search .................. 428/701, 428/304.4, 310.5, 446, 702
See application file for complete search history.

(56) References Cited

U.S. PATENT DOCUMENTS
3,962,059 A 6/1976 Kaup et al.
(Continued)

FOREIGN PATENT DOCUMENTS
EP 1400611 A1 3/2004
(Continued)

OTHER PUBLICATIONS
U.S. Appl. No. 61/231,510, filed Aug. 5, 2009.
(Continued)

*Primary Examiner* — Jonathan Langman
(74) *Attorney, Agent, or Firm* — Shumaker & Sieffert, P.A.

(57) ABSTRACT

An abradable coating may include a rare earth silicate. The abradable coating may be deposited over a substrate, an environmental barrier coating, or a thermal barrier coating. The abradable coating may be deposited on a gas turbine blade track or a gas turbine blade shroud to form a seal between the gas turbine blade track or gas turbine blade shroud and a gas turbine blade. The abradable coating may also include a plurality of layers, such as alternating first and second layers including, respectively, a rare earth silicate and stabilized zirconia or stabilized hafnia.

14 Claims, 5 Drawing Sheets

U.S. PATENT DOCUMENTS

| | | | |
|---|---|---|---|
| 3,964,877 | A | 6/1976 | Bessen et al. |
| 4,094,673 | A | 6/1978 | Erickson et al. |
| 4,914,794 | A | 4/1990 | Strangman |
| 5,350,599 | A | 9/1994 | Rigney et al. |
| 5,660,885 | A | 8/1997 | Hasz et al. |
| 5,714,202 | A | 2/1998 | Lemelson et al. |
| 5,773,141 | A | 6/1998 | Hasz et al. |
| 5,851,678 | A | 12/1998 | Hasz et al. |
| 5,869,146 | A | 2/1999 | McCluskey et al. |
| 5,871,820 | A | 2/1999 | Hasz et al. |
| 5,914,189 | A | 6/1999 | Hasz et al. |
| 6,057,047 | A | 5/2000 | Maloney |
| 6,261,643 | B1 | 7/2001 | Hasz et al. |
| 6,465,090 | B1 | 10/2002 | Stowell et al. |
| 6,468,648 | B1 | 10/2002 | McCluskey et al. |
| 6,562,409 | B2 | 5/2003 | Koshkarian et al. |
| 6,627,323 | B2 | 9/2003 | Williams et al. |
| 6,720,038 | B2 | 4/2004 | Darolia et al. |
| 6,723,674 | B2 | 4/2004 | Wang et al. |
| 6,759,151 | B1 | 7/2004 | Lee |
| 6,787,195 | B2 | 9/2004 | Wang et al. |
| 6,812,176 | B1 | 11/2004 | Zhu et al. |
| 6,887,528 | B2 | 5/2005 | Lau et al. |
| 6,887,595 | B1 | 5/2005 | Darolia et al. |
| 6,890,668 | B2 | 5/2005 | Bruce et al. |
| 6,893,750 | B2 | 5/2005 | Nagaraj et al. |
| 6,902,836 | B2 | 6/2005 | Eaton et al. |
| 6,933,061 | B2 | 8/2005 | Nagaraj et al. |
| 6,933,066 | B2 | 8/2005 | Nagaraj et al. |
| 7,008,674 | B2 | 3/2006 | Nagaraj et al. |
| 7,063,894 | B2 | 6/2006 | Sun et al. |
| 7,186,466 | B2 | 3/2007 | Zhu et al. |
| 7,226,668 | B2 | 6/2007 | Nagaraj et al. |
| 7,354,651 | B2 | 4/2008 | Hazel et al. |
| 7,374,818 | B2 | 5/2008 | Bhatia et al. |
| 7,374,825 | B2 | 5/2008 | Hazel et al. |
| 7,595,114 | B2 | 9/2009 | Meschter et al. |
| 7,666,512 | B2 | 2/2010 | Bhatia et al. |
| 2002/0098391 | A1 | 7/2002 | Tanaka et al. |
| 2003/0113553 | A1* | 6/2003 | Sun et al. ............... 428/446 |
| 2003/0138658 | A1 | 7/2003 | Taylor et al. |
| 2004/0038085 | A1 | 2/2004 | Litton et al. |
| 2004/0151840 | A1 | 8/2004 | Wang et al. |
| 2004/0170849 | A1 | 9/2004 | Ackerman et al. |
| 2005/0003172 | A1 | 1/2005 | Wheeler et al. |
| 2005/0129973 | A1* | 6/2005 | Eaton et al. ............. 428/641 |
| 2005/0164027 | A1 | 7/2005 | Lau et al. |
| 2006/0014029 | A1 | 1/2006 | Saak et al. |
| 2006/0024513 | A1 | 2/2006 | Schlichting et al. |
| 2006/0024527 | A1 | 2/2006 | Schlichting et al. |
| 2006/0073361 | A1 | 4/2006 | Fukudome et al. |
| 2006/0078750 | A1 | 4/2006 | Zhu et al. |
| 2006/0115661 | A1 | 6/2006 | Hazel et al. |
| 2006/0154093 | A1 | 7/2006 | Meschter et al. |
| 2006/0166018 | A1 | 7/2006 | Spitsberg et al. |
| 2006/0210800 | A1 | 9/2006 | Spitsberg et al. |
| 2006/0280952 | A1* | 12/2006 | Hazel et al. ............ 428/446 |
| 2006/0280955 | A1 | 12/2006 | Spitsberg et al. |
| 2006/0280963 | A1 | 12/2006 | Hazel et al. |
| 2007/0014996 | A1* | 1/2007 | Bhatia et al. ........... 428/446 |
| 2007/0082131 | A1 | 4/2007 | Doesburg et al. |
| 2007/0119713 | A1 | 5/2007 | Hasz |
| 2007/0141367 | A1 | 6/2007 | Darolia et al. |
| 2007/0184204 | A1 | 8/2007 | Balagopal et al. |
| 2008/0274336 | A1 | 11/2008 | Merrill et al. |
| 2009/0162556 | A1* | 6/2009 | Boutwell et al. ......... 427/383.1 |
| 2009/0184280 | A1 | 7/2009 | Lee |
| 2009/0186237 | A1 | 7/2009 | Lee |
| 2010/0080984 | A1 | 4/2010 | Lee |
| 2010/0136349 | A1 | 6/2010 | Lee |
| 2011/0033630 | A1 | 2/2011 | Naik et al. |

FOREIGN PATENT DOCUMENTS

| | | |
|---|---|---|
| EP | 1626039 A2 | 2/2006 |
| EP | 1666638 A1 | 6/2006 |
| EP | 1806435 A2 | 7/2007 |
| EP | 1829847 A2 | 9/2007 |
| EP | 1806435 A3 | 4/2008 |
| EP | 2192098 A2 | 6/2010 |
| EP | 2194164 A1 | 6/2010 |
| EP | 2287138 A2 | 2/2011 |
| WO | 2006023894 A2 | 3/2006 |
| WO | 2008103163 A2 | 8/2008 |
| WO | 2009091721 A2 | 7/2009 |
| WO | 2010039699 A3 | 4/2010 |

OTHER PUBLICATIONS

U.S. Appl. No. No. 61/318,567, filed Mar. 29, 2010.
U.S. Appl. No. No. 61/329,758, filed Apr. 30, 2010.
Office Action from U.S. Appl. No. 12/016,589, dated Jun. 10, 2011, 9 pp.
Notice of Appeal and Request for Review for U.S. Appl. No. 12/016,589, filed Sep. 12, 2011, 5 pp.
Office Action from U.S. Appl. No. 12/016,589, dated Dec. 21, 2010, 10 pp.
Response to Office Action dated Dec. 21, 2010, from U.S. Appl. No. 12/016,589, filed Mar. 21, 2011, 11 pp.
U.S. Appl. No. 61/367,067, by Kang N. Lee, filed Jul. 23, 2010.
Search Report and Written Opinion of Singapore patent application No. 200907910-4, mailed Mar. 9, 2011, 13 pp.
Lee et al., "Rare earth silicate environmental barrier coatings for Si/C/SiC composites and Si3N4 ceramics," Journal of the European Ceramic Society 25: 1705-1715, 2005.

* cited by examiner

ABRADABLE LAYER INCLUDING A RARE EARTH SILICATE

This application claims priority from U.S. Provisional Application Ser. No. 61/117,797 filed Nov. 25, 2008, the entire content of which is incorporated herein by reference.

TECHNICAL FIELD

The disclosure relates to abradable coatings for use in high temperature mechanical systems.

BACKGROUND

The components of high-temperature mechanical systems, such as, for example, gas-turbine engines, must operate in severe environments. For example, the high-pressure turbine blades, vanes, blade tracks and blade shrouds exposed to hot gases in commercial aeronautical engines typically experience metal surface temperatures of about 1000° C., with short-term peaks as high as 1100° C.

Components of high-temperature mechanical systems may include a Ni- or Co-based superalloy substrate. The substrate can be coated with a thermal barrier coating (TBC) to reduce surface temperatures. The thermal barrier coating may include a thermally insulative ceramic topcoat, and may be bonded to the substrate by an underlying metallic bond coat.

The TBC, usually applied either by air plasma spraying or electron beam physical vapor deposition, is most often a layer of yttria-stabilized zirconia (YSZ) with a thickness of about 100-500 μm. The properties of YSZ include low thermal conductivity, high oxygen permeability, and a relatively high coefficient of thermal expansion. The YSZ TBC is also typically made "strain tolerant" and the thermal conductivity further lowered by depositing a structure that contains numerous pores and/or pathways.

Economic and environmental concerns, i.e., the desire for improved efficiency and reduced emissions, continue to drive the development of advanced gas turbine engines with higher inlet temperatures. In some cases, this may lead to the replacement of the superalloy substrate with a silicon-based ceramic or ceramic matrix composite (CMC) substrate. Silicon-based ceramics or CMCs possess excellent high temperature mechanical, physical and chemical properties, and may allow gas turbine engines to operate at higher temperatures than gas turbine engines having superalloy components.

However, silicon-based ceramics and CMCs suffer from recession in combustion environments due to the volatilization of silica by water vapor. Thus, silicon-based ceramic and CMC substrates may be coated by a substantially non-porous environmental barrier coating (EBC), which protects the substrate from environmental degradation, such as water vapor attack or corrosion.

SUMMARY

In addition to raising the inlet temperature, gas turbine power and efficiency also may be improved by reducing the gap between a gas turbine blade and a surrounding blade track or blade shroud. One method of reducing the gap between blade and track or shroud includes coating the blade track or blade shroud with an abradable coating. As the turbine blade rotates, the tip of the turbine blade intentionally contacts the abradable coating and wears away a portion of the coating to form a groove in the abradable coating corresponding to the path of the turbine blade. The intimate fit between the blade and abradable coating provides a seal, which may reduce or eliminate leakage of gas around the blade tip and increase the efficiency of the gas turbine engine by up to 5% in some cases.

In general, the present disclosure is directed to an abradable coating that may be applied over a blade track or blade shroud. The abradable coating includes a rare earth silicate, and in some embodiments, may consist essentially of a rare earth silicate. The abradable coating may be deposited over at least one of an environmental barrier coating (EBC) and a thermal barrier coating (TBC), or may be deposited over a substrate without an EBC or TBC.

In some embodiments, the abradable coating may include a plurality of layers. For example, the abradable coating may include a first layer including a rare earth silicate and a second layer including stabilized zirconia (zirconium oxide) or stabilized hafnia (hafnium oxide). The first and second layers may alternate within the abradable coating, and the abradable coating may include one or more pair of first and second layers.

In one aspect, the disclosure is directed to a multilayer environmental barrier coating and abradable system including an environmental barrier coating (EBC) and an abradable coating deposited over the EBC. The abradable coating includes a rare earth silicate, and may consist essentially of a rare earth silicate.

In another aspect, the disclosure is directed to an article including a substrate and an abradable coating deposited over the EBC. The abradable coating includes a rare earth silicate, and may consist essentially of a rare earth silicate.

In yet another aspect, the disclosure is directed to a method including depositing over a substrate an abradable coating including a rare earth silicate. In some embodiments, the abradable layer may be deposited by thermal spraying.

The details of one or more embodiments of the invention are set forth in the accompanying drawings and the description below. Other features, objects, and advantages of the invention will be apparent from the description and drawings, and from the claims.

DETAILED DESCRIPTION

In general, the present disclosure is directed to an abradable coating that may be applied over a component of a high temperature mechanical system, such as a gas turbine blade track or blade shroud. The abradable coating includes a rare earth silicate, and in some embodiments, may consist essentially of a rare earth silicate. The abradable coating may be deposited over at least one of an environmental barrier coating, a thermal barrier coating, and a substrate, and may be deposited as a porous layer.

In some embodiments, the abradable coating may include a plurality of layers. For example, the abradable coating may include a first layer including a rare earth silicate and a second layer including stabilized zirconia (zirconium oxide) or stabilized hafnia (hafnium oxide). The first and second layers may alternate within the abradable coating, and the abradable coating may include one or more pair of first and second layers.

The abradable coating may provide a seal between the blade track or blade shroud and a gas turbine blade. The gas turbine blade may intentionally contact and abrade at least a portion of the abradable coating to form a groove in the abradable coating corresponding to the path of the turbine blade. This allows contact between the turbine blade and abradable coating while also allowing the turbine blade to rotate freely. In addition, the abradable coating may be usable in high temperature systems where rubber or other polymeric seals would degrade.

Figure 1:
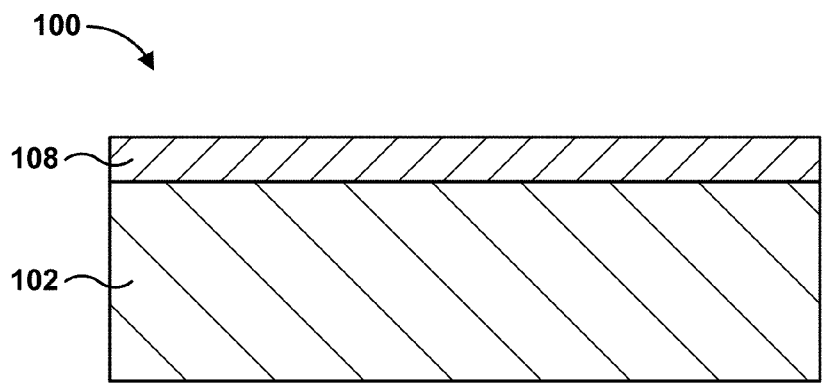
FIG. 1 is a cross-sectional diagram illustrating an example article that includes an abradable coating deposited over a substrate.

FIG. 1 illustrates a cross-sectional view of an exemplary article 100 used in a high-temperature mechanical system. Article 100 includes an abradable coating 108 deposited over a substrate 102.

Article 100 may be a component of a high temperature mechanical system, such as, for example, a gas turbine engine or the like. In some embodiments, article 100 may include a gas turbine blade track or gas turbine blade shroud. However, while the following description will be directed primarily to a gas turbine blade track, it will be understood that the disclosure is not limited to such embodiments. Rather, abradable coating 108 may be deposited over any article which requires or may benefit from an abradable coating. For example, abradable coating 108 may be deposited on a cylinder of an internal combustion engine, an industrial pump, a housing or internal seal ring of an air compressor, or an electric power turbine.

In some embodiments, as illustrated in FIG. 1, abradable coating 108 may be deposited directly on substrate 102. In other embodiments, abradable coating 108 may be deposited over substrate 102, with one or more intermediate layer between abradable coating 108 and substrate 102, as illustrated in FIGS. 2-5. As used herein, "deposited over" is defined as a layer or coating that is deposited on top of another layer or coating, and encompasses both a first layer or coating deposited immediately adjacent a second layer or coating and a first layer or coating deposited on top of a second layer or coating with one or more intermediate layer or coating present between the first and second layers or coatings. In contrast, "deposited directly on" denotes a layer or coating that is deposited immediately adjacent another layer or coating, i.e., there are no intermediate layers or coatings.

In some embodiments, substrate 102 may include a superalloy, such as a superalloy based on Ni, Co, Ni/Fe, or the like. A substrate 102 including a superalloy may include other additive elements to alter its mechanical properties, such as toughness, hardness, temperature stability, corrosion resistance, oxidation resistance, and the like, as is well known in the art. Any useful superalloy may be utilized for substrate 102, including, for example, those available from Martin-Marietta Corp., Bethesda, Md., under the trade designation MAR-M247; those available from Cannon-Muskegon Corp., Muskegon, Mich., under the trade designation CMSX-4 or CMXS-10; and the like.

In other embodiments, substrate 102 may include a ceramic or ceramic matrix composite (CMC). A substrate 102 including a ceramic or CMC may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave.

The filler composition, shape, size, and the like may be selected to provide the desired properties to the CMC. For example, the filler material may be chosen to increase the toughness of a brittle ceramic matrix. The filler may also be chosen to modify a thermal conductivity, electrical conductivity, thermal expansion coefficient, hardness, or the like of the CMC.

In some embodiments, the filler composition may be the same as the ceramic matrix material. For example, a silicon carbide matrix may surround silicon carbide whiskers. In other embodiments, the filler material may include a different composition than the ceramic matrix, such as aluminum silicate fibers in an alumina matrix, or the like. One preferred CMC includes silicon carbide continuous fibers embedded in a silicon carbide matrix.

Some example ceramics and CMCs which may be used for substrate 102 include ceramics containing Si, such as SiC and $Si_3N_4$; composites of SiC or $Si_3N_4$ and silicon oxynitride or silicon aluminum oxynitride; metal alloys that include Si, such as a molybdenum-silicon alloy (e.g., $MoSi_2$) or niobium-silicon alloys (e.g., $NbSi_2$); and oxide-oxide ceramics, such as an alumina or aluminosilicate matrix with a NEXTEL™ Ceramic Oxide Fiber 720 (available from 3M Co., St. Paul, Minn.).

Abradable coating 108 may include a material that provides at least one of erosion resistance, abradability, corrosion resistance, thermal shock resistance, manufacturability and high temperature capability. For example, abradability may include a disposition to break into relatively small pieces when exposed to a sufficient physical force. Abradability may be influenced by the material characteristics of abradable coating 108, such as fracture toughness and fracture mechanism (e.g., brittle fracture), as well as the porosity of abradable coating 108. Thermal shock resistance and high temperature capability may be important for use in a gas turbine engine, in which abradable coating 108 is exposed to wide temperature variations from high operating temperatures to low environmental temperatures when the gas turbine engine is not operating.

In order to accomplish at least some of the desired material properties mentioned above, abradable coating 108 may include at least one rare earth silicate. The rare earth silicate may include a silicate of at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium). The rare earth silicate may include a rare earth monosilicate, which has the chemical formula $RE_2O_3$—$SiO_2$ or, equivalently, $RE_2SiO_5$, where RE is a rare earth element, may include a rare earth disilicate, which has the formula $RE_2O_3$-$2SiO_2$ or, equivalently, $RE_2Si_2O_7$, where RE is a rare earth element, or may include a mixture of both rare earth monosilicate and rare earth disilicate. A rare earth monosilicate may be formed by a chemical reaction between one silica molecule and one rare earth oxide molecule, while a rare earth disilicate may be formed by a chemical reaction between two silica molecules and one rare earth oxide molecule.

In some embodiments, abradable coating 108 may include a mixture of rare earth monosilicate and rare earth disilicate. For example, abradable coating 108 may include a predominance of rare earth monosilicate when a rare earth oxide and silica are present in approximately a 1:1 molar ratio, but may still include some rare earth disilicate. Similarly, abradable coating 108 may include a predominance of rare earth disilicate when a rare earth oxide and silica are present in approximately a 1:2 molar ratio, but may still include some rare earth monosilicate.

In addition, abradable coating 108 may further include a silica ($SiO_2$) molecule that is not associated with a rare earth oxide molecule, a rare earth oxide molecule that is not associated with a silica molecule, or both. For example, when the at least one rare earth oxide and silica are present in a rare earth oxide-to-silica ratio between approximately 1:1 and 1:2 or greater that approximately 1:2, abradable coating 108 may include solitary silica (i.e., silica not associated with a rare earth oxide). As another example, when the ratio of rare earth oxide-to-silica is less than approximately 1:1, abradable coating 108 may include solitary rare earth oxide (i.e., rare earth oxide not associated with silica).

Abradable coating 108 may further include other, optional, additive elements or compounds. The additive elements or compounds may modify the mechanical and/or chemical properties of abradable coating 108, such as, for example, a coefficient of thermal expansion of abradable coating, or a chemical or mechanical compatibility of abradable coating 108 with an adjacent layer, such as substrate 102. The additive elements may include, for example, alumina, $Ta_2O_5$, $HfSiO_4$, alkali oxides, alkali earth oxides, or mixtures thereof.

As described briefly above, abradable coating 108 may be deposited over substrate 102 with one or more layers or coatings between abradable coating 108 and substrate 102. For example, abradable coating 108 may be deposited over a bond coat, which is deposited over substrate 102. Further details regarding exemplary bond coats will be described with reference to FIGS. 2 and 3 below, and any bond coat described in reference to those figures may be deposited over substrate 102, with abradable coating 108 deposited over the bond coat.

Figure 2:
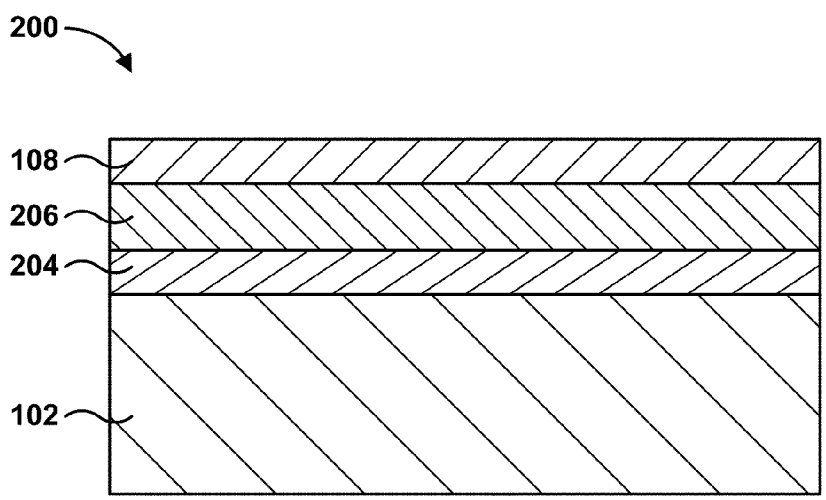
FIG. 2 is a cross-sectional diagram illustrating an example article that includes an abradable coating deposited over an environmental barrier coating, which is deposited over a bond coat.

FIG. 2 illustrates a cross-sectional view of an example article 200 including a bond coat 204 deposited over substrate 102, an environmental barrier coating (EBC) 206 deposited over bond coat 204, and abradable coating 108 deposited over EBC 206. Abradable coating 108 may also be deposited directly over bond coat 204, without EBC 206 being present.

Bond coat 204 may be deposited over or deposited directly on substrate 102. Bond coat 204 may improve adhesion between EBC 106 and substrate 102. In embodiments in which substrate 102 includes a superalloy, bond coat 204 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-$Ni_3Al$ nickel aluminide alloy (either unmodified or modified by Pt, Cr, Hf, Zr, Y, Si, and combinations thereof), or the like.

In other embodiments, bond coat 204 may include a ceramic or other material that is compatible with a substrate 102 that includes a ceramic or CMC. For example, bond coat 204 may include mullite (aluminum silicate, $Al_6Si_2O_{13}$), silica, silicides, silicon, or the like. Bond coat 204 may further include other ceramics, such as rare earth silicates including silicates of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium). Some preferred compositions of a bond coat 204 for depositing over a CMC substrate 102 include silicon, mullite, and ytterbium silicate.

Bond coat 204 may be selected based on a number of considerations, including the chemical composition and phase constitution of EBC 206 and substrate 102. For example, when substrate 102 includes a superalloy with a γ-Ni+γ'-$Ni_3Al$ phase constitution, bond coat 204 preferably includes a γ-Ni+γ'-$Ni_3Al$ phase constitution to better match the coefficient of thermal expansion and/or chemistry of substrate 102, and therefore increase the mechanical and/or chemical stability (e.g., adhesion, chemical compatibility, or the like) of bond coat 204 to substrate 102. Alternatively, when substrate 102 includes a CMC, bond coat 204 preferably includes silicon and/or a ceramic, such as, for example, mullite or a rare earth silicate.

Figure 3:
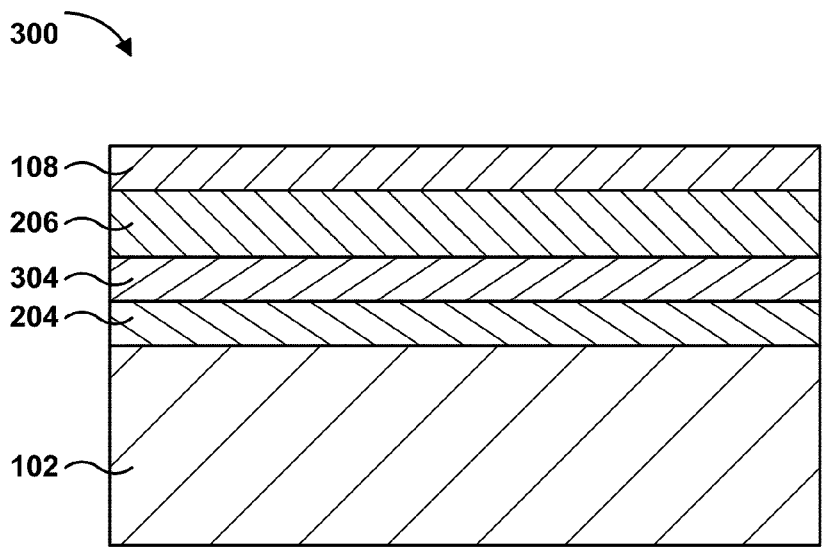
FIG. 3 is a cross-sectional diagram illustrating an example article that includes an abradable coating deposited over an environmental barrier coating, which is deposited over an intermediate layer and a bond coat.

In some embodiments, an article 300, shown in cross-section in FIG. 3, may include multiple layers between substrate 102 and EBC 206. For example, bond coat 204 may be deposited over or deposited directly on substrate 102, and an intermediate layer 304 may be deposited over or deposited directly on bond coat 204. Bond coat 204 and intermediate layer 304 may be desirable because each layer may perform a separate function. For example, in some embodiments in which substrate 102 is a CMC including silicon carbide, a bond coat 204 including silicon may be deposited on substrate 102, followed by the deposition of intermediate layer 304 including mullite. The silicon layer may provide bonding while the mullite provides a gradual transition of thermal expansion and prevents water vapor from reaching the silicon bond coat 204.

Figure 4:
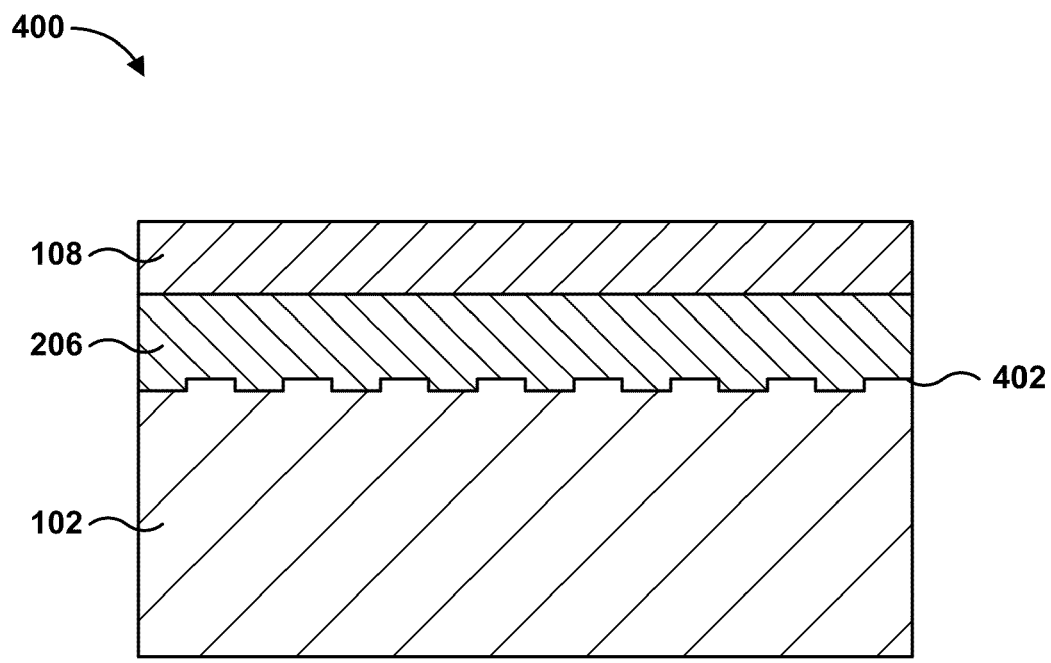
FIG. 4 is cross-sectional diagram illustrating another example article that includes an abradable coating deposited over an environmental barrier coating, which is deposited directly on a substrate.

In other embodiments, article 100 may not include a bond coat 204. For example, in some embodiments, as illustrated in FIG. 4, an article 400 may include EBC 206 deposited directly on substrate 102. Bond coat 204 may not be required or desired when EBC 206 and substrate 102 are chemically and/or mechanically compatible. For example, in embodiments in which EBC 206 and substrate 102 adhere sufficiently strongly to each other, bond coat 204 may not be necessary.

EBC 206 may include any layer which prevents environmental degradation of substrate 102. For example, EBC 206 may include materials that are resistant to oxidation or water vapor attack, and provide at least one of water vapor stability, chemical stability and environmental durability to substrate 102. EBC 206 may include, for example, mullite; glass ceramics such as barium strontium alumina silicate ($BaO_x$—$SrO_{1-x}$—$Al_2O_3$-$2SiO_2$; BSAS), barium alumina silicate (BaO—$Al_2O_3$-$2SiO_2$; BAS), calcium alumina silicate (CaO—$Al_2O_3$-$2SiO_2$), strontium alumina silicate (SrO—$Al_2O_3$-$2SiO_2$; SAS), lithium alumina silicate ($Li_2O$—$Al_2O_3$-$2SiO_2$; LAS) and magnesium alumina silicate ($2MgO$-$2Al_2O_3$-$5SiO_2$; MAS); rare earth silicates and the like. EBC 206 may be applied by any useful technique, such as plasma spraying, physical vapor deposition (PVD), including electron beam physical vapor deposition (EB-PVD) and directed vapor deposition (DVD), chemical vapor deposition, cathodic arc deposition, slurry dipping, sol-gel coating, electrophoretic deposition and the like, and may be deposited as a substantially non-porous structure, which prevents water vapor or other gases from contacting substrate 102.

In some embodiments, as FIG. 4 further illustrates, substrate 102 may include a patterned or etched surface 402. Patterned surface 402 may improve adhesion between EBC 206 and substrate 102 by compartmentalizing the strain on the interface between EBC 206 and substrate 102 due to any thermal expansion coefficient mismatch between EBC 206 and substrate 102. Patterned surface 402 may include a pattern that extends in substantially one dimension along surface 402, such as an array of parallel grooves or ridges, or may include a pattern that extends in two dimensions along surface 402, such as an array of parallel lines extending in two or more directions and forming an array of rectangles, triangles, diamonds, or other shapes.

Patterned surface 402 may be formed by, for example, chemical or mechanical etching, laser ablation, or laser cladding.

Figure 5:
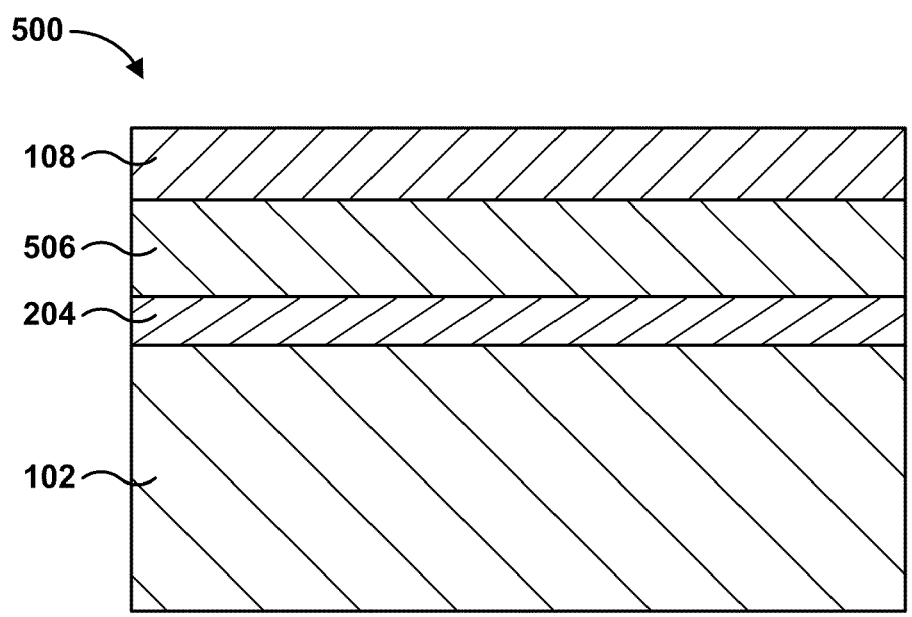
FIG. 5 is a cross-sectional diagram illustrating an exemplary article that includes an abradable coating deposited over a thermal barrier coating.

In other embodiments, as illustrated in FIG. 5, a TBC 506 may be substituted for EBC 206. TBC 506 may be deposited over bond coat 204, as illustrated in FIG. 5, or may be deposited over substrate 102 without bond coat 204. TBC 506 may provide thermal insulation to substrate 102 to lower the temperature experienced by substrate 102. TBC 506 may include any useful insulative layer, including, for example, ceramic layers comprising zirconia or hafnia. TBC 506 may include other elements or compounds to modify a desired characteristic of the TBC 506, such as, for example, phase stability, thermal conductivity, or the like. Exemplary additive elements or compounds include, for example, rare earth oxides.

TBC 506 may be applied by any useful technique, including, for example, plasma spraying, electron beam physical vapor deposition, chemical vapor deposition, and the like. TBC 506 may be deposited as a porous structure, which reduces the effective thermal conductivity (by both radiation and conduction) of TBC 506. While not wishing to be bound by any theory, the porous structure may reduce the thermal conductivity of TBC 506 by reducing the area through which heat is conducted and by providing a large refractive index difference between the pores and the material from which TBC 506 is made, which can reduce heat transfer by radiation.

In some embodiments, an EBC 206/TBC 506 bilayer or multilayer coating may be desired to provide thermal protection and resistance to oxidation, water vapor attack, or the like. In some embodiments, TBC 506 may be deposited over EBC 206, while in other embodiments, EBC 206 may be deposited over TBC 506. In either case, the EBC 206/TBC 506 bilayer or multilayer coating may be applied over substrate 102 with or without bond coat 204.

Figure 6:
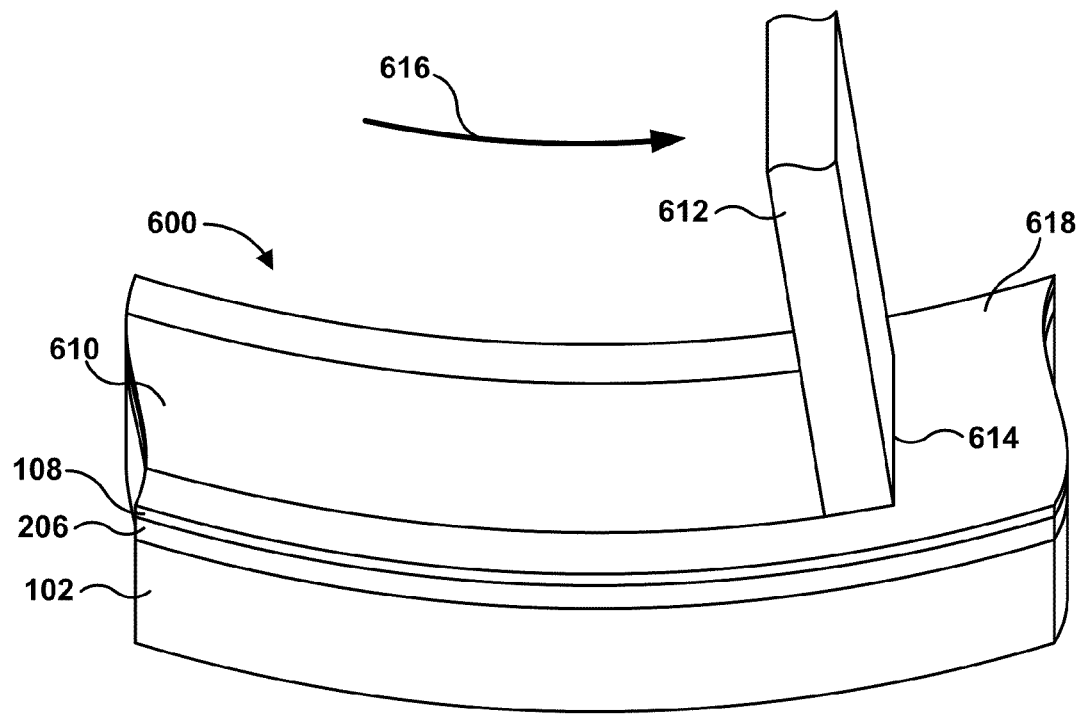
FIG. 6 is a conceptual diagram illustrating an example gas turbine blade and a gas turbine blade track or gas turbine blade shroud.

Regardless of whether an article includes EBC 206, TBC 506, or both, abradable coating 108 may be deposited over or deposited directly on TBC 506 or EBC 206. Alternatively, the article may not include an EBC 206 or TBC 506, and abradable coating 108 may be deposited over or directly on substrate 102. As described briefly above, abradable coating 108 may be deposited as a porous layer, which is configured to abrade when contacted by a gas turbine blade tip. For example, as depicted in the conceptual diagram illustrated in FIG. 6, a gas turbine blade track or gas turbine blade shroud 600 (hereafter blade track 600) may include substrate 102, EBC 206 deposited over substrate 102, and abradable coating 108 deposited over EBC 106. FIG. 6 also illustrates a gas turbine blade 612, which includes a blade tip 614 which contacts abradable coating 108.

Blade tip 614 may include an abrasive coating or may not include an abrasive coating. In some embodiments, the abrasive coating may facilitate abrasion of abradable coating 108, and may protect blade tip 614 from damage from abradable coating 108. The abrasive coating may include, for example, cubic boron nitride or another coating with high fracture toughness and acceptable high temperature performance. However, a blade tip 614 including an abrasive coating may be more complex and thus more expensive than a blade tip 614 that does not include an abrasive coating. Accordingly, in some embodiments, blade tip 614 may not include an abrasive coating.

The contact between blade tip 614 and abradable coating 108 may be intentional for at least some of the temperatures experienced by blade track 600 and blade 612. For example, gas turbine blade 612 may experience thermal expansion when heated to its operating temperature from the temperature when the gas turbine engine is not in use. At the same time, the blade track 600 may also undergo thermal expansion when heated to the operating temperature. The thermal expansion experienced by turbine blade 612 and blade track 600 may result in a change in distance between substrate 102 of blade track 600 and blade tip 614. In some embodiments, the thickness of abradable layer 108 may be selected such that blade tip 614 approximately contacts surface 618 of abradable coating 108 at a low temperature, such as a minimum operating temperature or a temperature of the surrounding environment when the gas turbine engine is not operating. The thickness of abradable coating 108 may also be selected such that when turbine blade 612 and turbine track or turbine shroud 600 are at an operating temperature, blade tip 614 contacts and abrades at least a portion of abradable coating 108, but does not contact EBC 206.

As FIG. 6 illustrates, as blade 612 rotates in a direction indicated by arrow 616, blade tip 614 may contact abradable coating 108 and abrade a portion of coating 108 to form a groove 610 in abradable coating 108. The depth of groove 610 corresponds to the extent to which blade 612 extends into abradable coating 108. The depth of groove 610 may not be constant, as variations in fit between blade track 600 and turbine blade 612 may exist along the length of blade track 600.

Of course, in actual gas turbine engines, more than one blade is typically used. The gas turbine blades may follow substantially the same path along blade track 600 as the blades rotate during operation. However, the turbine blades may vary slightly in length or alignment, and thus may abrade different portions of abradable coating 108. Accordingly, groove 610 may be essentially a superposition of the grooves formed by each turbine blade 612. Because of this, the seal between a turbine blade 612 and abradable layer 108 may not be perfect, but may be improved compared to a seal between a turbine blade 612 and blade track 600 that does not include an abradable coating 108.

Abradable coating 108 may be deposited over or deposited directly on substrate 102, EBC 206 or TBC 506 using, for example, a thermal spraying technique, such as, for example, plasma spraying. Porosity of abradable coating 108 may be controlled by the use of coating material additives and/or processing techniques to create the desired porosity. In some embodiments, substantially closed pores may be desired.

For example, a coating material additive that melts or burns at the use temperatures of the component (e.g., blade track 600) may be incorporated into the coating material that forms abradable coating 108. The coating material additive may include, for example, graphite, hexagonal boron nitride, or a polymer such as a polyester, and may be incorporated into the coating material prior to deposition of the coating material over EBC 206 or TBC 506 to form abradable coating 108. The coating material additive then may be melted or burned off in a post-deposition heat treatment, or during operation of the gas turbine engine, to form pores in abradable coating 108. The post-deposition heat-treatment may be performed at up to about 1150° C. for a component having a substrate 102 including a superalloy, or at up to about 1500° C. for a component having a substrate 102 including a CMC or other ceramic.

The coating material additive may be exposed to various processing techniques to improve the amount of additive that remains entrapped within abradable coating 108 after thermal spraying. In some embodiments, the coating material and coating material additive may undergo attrition ball milling to attach the particles of the coating material additive to particles of the coating material. In other embodiments, the coating material additive may be attached to the coating material with an organic binder, such as, for example, a cellular methyl carbonate (CMC), which may also contain sodium or carbon. The use or processing techniques to improve the amount of additive that remains entrapped within abradable coating 108 after thermal spraying may improve at least one of the extent of porosity and the uniformity of porosity in abradable coating 108.

The porosity of abradable coating 108 can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in abradable coating 108.

In some embodiments, the porosity of abradable coating 108 may be controlled to vary throughout at least a portion of abradable coating 108. For example, the porosity of abradable layer may be controlled to be greater adjacent surface 618 than adjacent EBC 206. This may be particularly advantageous when EBC 206 and abradable coating 108 are deposited in a unitary structure with varying porosity, instead of two separate layers, as will be described in further detail below.

As described briefly above, abradable coating 108 may be deposited to a range of thicknesses depending on various considerations. One consideration may be a predicted size change of components (e.g., blade 612 and blade track 600) at a low operating temperature or temperatures when the turbine engine is not operating and a maximum operating temperature. For example, thermal expansion of blade 612 may be expected to reduce the distance between blade tip 614 and substrate 102. In this example, the thickness of abradable coating 108 may be selected to be substantially equal to or greater than the predicted difference in the distance between blade tip 614 and substrate 102 at low operating temperatures and high operating temperatures. This may allow contact and formation of a seal between blade 612 and blade track or blade shroud 610 at substantially all operating temperatures, which may improve efficiency of the gas turbine engine throughout its operational temperature range.

In some embodiments, abradable coating 108 may be deposited to a thickness of up to approximately 0.1 inches (about 2.5 mm). In other embodiments, abradable coating 108 may be deposited to a thickness of approximately 0.030 to approximately 0.040 inches (approximately 0.76 mm to approximately 1.02 mm). In some embodiments, abradable coating 108 may be deposited to a thickness approximately equal to or greater than the desired final thickness and may be machined to the desired final thickness.

While abradable coating 108 has been described herein as a separate layer from EBC 206, in some embodiments, abradable coating 108 and EBC 206 may be formed as a unitary structure. For example, a thermal spraying process may include depositing a substantially nonporous EBC 206, and gradually changing the composition of the coating feed to include polyester, graphite or hexagonal Boron Nitride to provide a transition to a more porous layer. This may simplify the manufacture of the EBC 206 and abradable coating 108, and may also improve the adhesion of abradable coating 108 to EBC 206 by producing a gradual transition of the thermal conductivity and thermal expansion coefficients of the abradable coating 108 and EBC 206.

Figure 7:
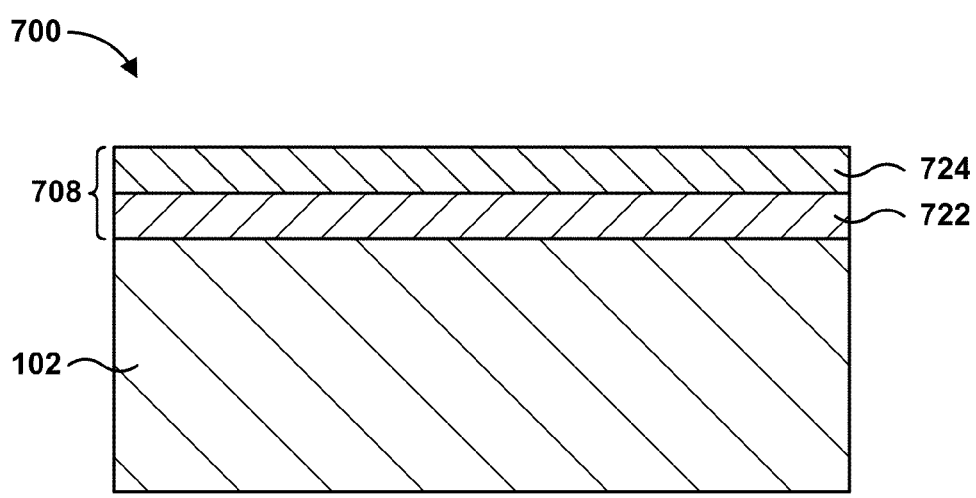
FIG. 7 is a cross-sectional diagram of an abradable coating, which includes a first layer and a second layer, deposited over a substrate.

FIG. 7 illustrates an example of an article 700 that includes a multilayer abradable coating 708 deposited over a substrate 102. In the embodiment illustrated in FIG. 7, multilayer abradable coating 708 includes a first layer 722 deposited over substrate 102 and a second layer 724 deposited over first layer 722. First layer 722 may comprise a first material, while second layer 724 may comprise a second material different from the first material.

In other embodiments, multilayer abradable coating 708 may include more than two layers 722 and 724, such as, for example, a plurality of pairs of first layer 722 and second layer 724. For example, multilayer abradable coating 708 may include two pairs of first layer 722 and second layer 724, arranged in alternating layers (e.g., first layer 722, second layer 724, first layer 722, second layer 724). Multilayer abradable coating 708 may include any number of pairs of first layer 722 and second layer 724.

First layer 722 may include, or may consist essentially of, a rare earth silicate, similar to those described above with reference to abradable layer 108. First layer 722 may include, for example, monosilicates, disilicates, or both of at least one of Lu, Yb, Tm, Er, Ho, Dy, Tb, Gd, Eu, Sm, Pm, Nd, Pr, Ce, La, Y, Sc, and the like. In some embodiments, first layer 722 may also include at least one of silica or a rare earth oxide, which may be present in addition to the rare earth silicate. First layer 722 also may include at least one of alumina, $Ta_2O_5$, $HfSiO_4$, alkali oxides, and alkali earth oxides.

Second layer 724 may include, or may consist essentially of, stabilized zirconia or stabilized hafnia. Each of stabilized zirconia and stabilized hafnia includes the base oxide (e.g., zirconia or hafnia) stabilized by the inclusion of one or more additive elements or compounds. For example, stabilized zirconia or stabilized hafnia may include a rare earth oxide incorporated in the zirconia or hafnia. The rare earth oxide may modify or improve the phase stability, thermal conductivity, or another characteristic of the hafnia or zirconia.

While FIG. 7 illustrates second layer 724 as deposited over first layer 722, in other embodiments, second layer 724 (e.g., the layer include stabilized zirconia or stabilized hafnia) may be deposited over or deposited directly on substrate 102. First layer 722 (e.g., the layer including the rare earth silicate) then may be deposited over or deposited directly on second layer 724. Once again, abradable coating 708 may include more than one layer pair of first layer 722 and second layer 724.

EXAMPLES

Example 1

Figure 8:
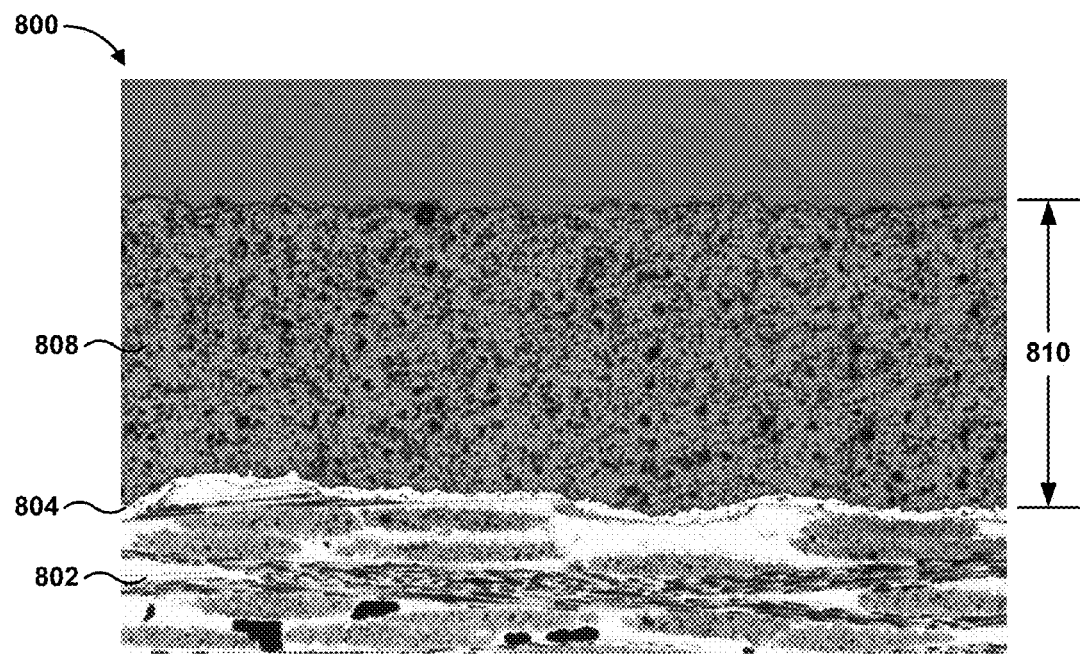
FIG. 8 is a cross-sectional micrograph of an example article including a CMC substrate coated with a silicon bond coat and an abradable coating.

FIG. 8 is a cross-sectional micrograph of an article 800 including a Si bond coat 804 having a thickness of about 0.003 inches deposited over a SiC/SiC ceramic matrix composite (CMC) substrate 802. The article 800 further includes an $Yb_2Si_2O_7$ (ytterbium disilicate) abradable coating 808 deposited over the Si bond coat 804 to a thickness of about 60 mils (about 1.524 mm), as indicated by reference numeral 810. Each of Si bond coat 804 and $Yb_2Si_2O_7$ abradable coating 808 was deposited by plasma spraying. FIG. 8 shows the article 800 after exposure to 100 one-hour thermal cycles in steam at 1600° F. As FIG. 8 illustrates, the $Yb_2Si_2O_7$ abradable coating maintained good adherence to the SiC/SiC CMC substrate 802 after completion of the thermal cycles.

Example 2

Figure 9:
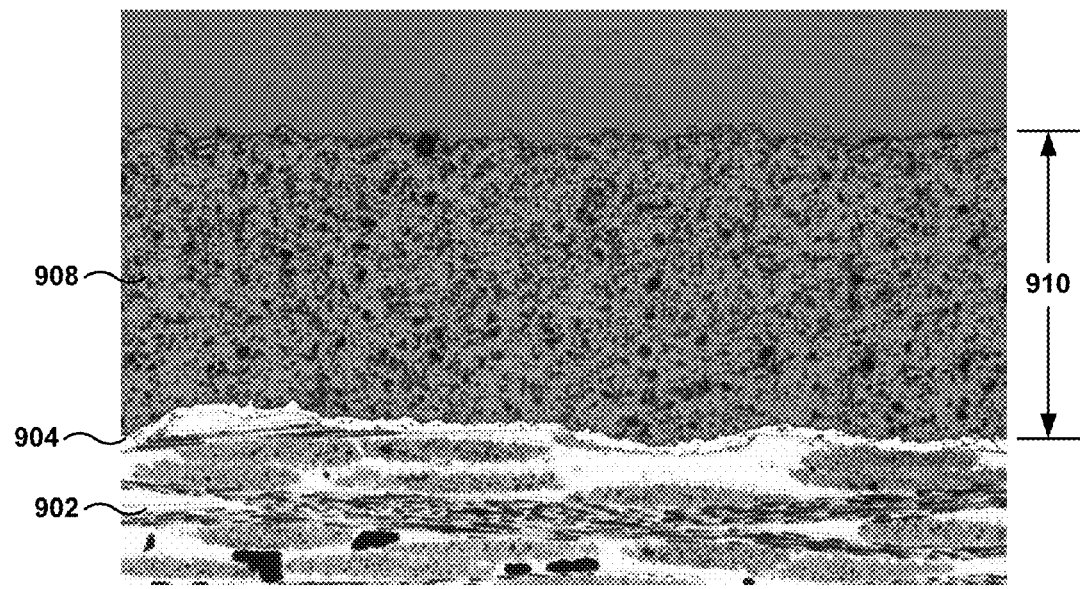
FIG. 9 is a cross-sectional micrograph of another example article including a CMC substrate coated with a silicon bond coat and an abradable coating.

FIG. 9 is a cross-sectional micrograph of an article 900 including a Si bond coat 904 having a thickness of about 0.003 inches deposited over a SiC/SiC ceramic matrix composite (CMC) substrate 902. The article 900 further includes an $Yb_2Si_2O_7$ (ytterbium disilicate) abradable coating 908 deposited over the Si bond coat 904 to a thickness of about 60 mils (about 1.524 mm), as indicated by reference numeral 910. Each of Si bond coat 904 and $Yb_2Si_2O_7$ abradable coating 908 was deposited by plasma spraying. FIG. 9 shows the article 900 after exposure to 100 one-hour thermal cycles in steam at 2400° F. As FIG. 9 illustrates, the $Yb_2Si_2O_7$ abradable coating 908 maintained good adherence to the SiC/SiC CMC substrate 902 after completion of the thermal cycles.

Example 3

Figure 10:
FIG. 10 is a cross-sectional micrograph of an example article including a CMC substrate coated with a silicon bond coat and a multilayer abradable coating.

FIG. 10 is a cross-sectional micrograph of an article 1000 including a Si bond coat 1004 having a thickness of about 0.003 inches deposited over a SiC/SiC ceramic matrix composite (CMC) substrate 1002. The article 1000 further includes a multilayer abradable coating 1008 deposited over the Si bond coat 1000. The multilayer abradable coating 1008 includes a layer of $Yb_2Si_2O_7$ (ytterbium disilicate) 1010 deposited over the Si bond coat 1004 and a layer of zirconia 1012 stabilized by about 7 wt. % (weight percent) yttrium oxide deposited over the $Yb_2Si_2O_7$ 1010. The $Yb_2Si_2O_7$ 1010 was deposited to a thickness of about 40 mils (about 1.016 mm), as indicated by reference numeral 1014, and the layer of zirconia 1012 was deposited to a thickness of about 10 mils (about 0.254 mm), as indicated by reference numeral 1016. Each of Si bond coat 1004 and $Yb_2Si_2O_7$ abradable coating 1008 was deposited by plasma spraying. FIG. 10 shows the article 1000 after exposure to 100 one-hour thermal cycles in steam at 1600° F. As FIG. 10 illustrates, the multilayer abradable coating 1008 maintained good adherence to the SiC/SiC CMC substrate 1002 after completion of the thermal cycles.

Example 4

Figure 11:
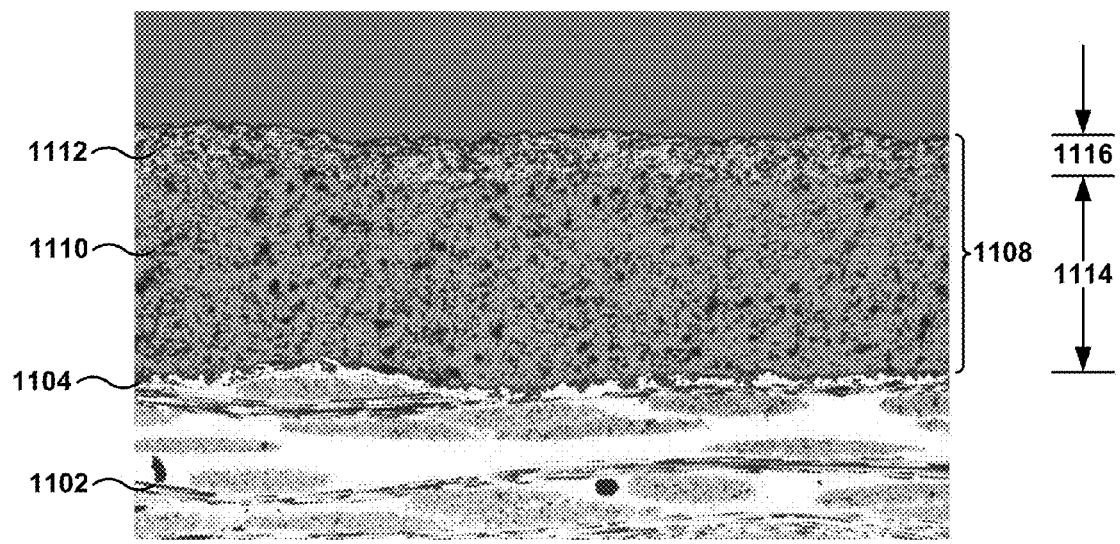
FIG. 11 is a cross-sectional micrograph of another example article including a substrate coated with a silicon bond coat and a multilayer abradable coating.

FIG. 11 is a cross-sectional micrograph of an article 1100 including a Si bond coat 1104 having a thickness of about 0.003 inches deposited over a SiC/SiC ceramic matrix composite (CMC) substrate 1102. The article 1100 further includes a multilayer abradable coating 1108 deposited over the Si bond coat 1100. The multilayer abradable coating 1108 includes a layer of $Yb_2Si_2O_7$ (ytterbium disilicate) 1110 deposited over the Si bond coat 1104 to a thickness of about 40 mils (about 1.016 mm), as indicated by reference numeral 1114, and a layer of zirconia stabilized by about 7 wt. % (weight percent) yttrium oxide deposited over the $Yb_2Si_2O_7$ 1110. Each of Si bond coat 1104 and multilayer abradable coating 1108 was deposited by plasma spraying. FIG. 11 shows the article 1100 after exposure to 100 one-hour thermal cycles in steam at 2400° F. As FIG. 11 illustrates, the multilayer abradable coating 1108 maintained good adherence to the SiC/SiC CMC substrate 1102 after completion of the thermal cycles.

Various embodiments of the invention have been described. These and other embodiments are within the scope of the following claims.

The invention claimed is:

1. A system comprising:
   a blade track or blade shroud comprising:
      a substrate,
      an environmental barrier coating (EBC) formed over the substrate, wherein the EBC comprises at least one of mullite, barium strontium alumina silicate, barium alumina silicate, calcium alumina silicate, strontium alumina silicate, lithium alumina silicate, magnesium alumina silicate, or a rare earth silicate, and
      a multilayer, porous abradable coating formed over the EBC, wherein the multilayer, porous abradable coating comprises a plurality of layer pairs, and wherein each layer pair comprises a first layer including a rare earth silicate and a second layer including at least one of stabilized zirconia and stabilized hafnia; and
   a gas turbine blade comprising a blade tip, wherein the blade track or blade shroud and the gas turbine blade are configured so the blade tip contacts a portion of the multilayer, porous abradable coating during rotation of the gas turbine blade, and wherein the multilayer, porous abradable coating is configured to be abraded by the contact by the blade tip.

2. The system of claim 1, wherein the environmental barrier coating comprises a rare earth silicate.

3. The system of claim 1, wherein at least one of the first layers of the multilayer, porous abradable coating comprises at least one of $RE_2SiO_5$ and $RE_2Si_2O_7$, and wherein RE is a rare earth element.

4. The system of claim 1, wherein at least one of the first layers of the multilayer, porous abradable coating further comprises a rare earth oxide.

5. The system of claim 1, wherein at least one of the first layers of the multilayer, porous abradable coating further comprises silica.

6. The system of claim 1, wherein at least one of the first layers of the multilayer, porous abradable coating further comprises at least one of alumina, $Ta_2O_5$, $HfSiO_4$, an alkali oxide, and an alkali earth oxide.

7. The system of claim 1, wherein the multilayer, porous abradable coating comprises a first surface adjacent the environmental barrier coating (EBC) and a second surface opposite the EBC, and wherein a first porosity of the multilayer, porous abradable coating proximate the first surface is different from a second porosity of the multilayer, porous abradable coating proximate the second surface.

8. The system of claim 7, wherein the first porosity is less than the second porosity.

9. The system of claim 1, wherein the substrate comprises a ceramic matrix composite.

10. The system of claim 9, further comprising a bond coat including at least one of mullite, silica, a silicide, or silicon, wherein the environmental barrier layer is formed over the bond coat.

11. The system of claim 1, wherein the substrate comprises a superalloy.

12. The system of claim 11, further comprising a bond coat including at least one of an MCrAlY alloy, a β-NiAl nickel aluminide alloy, or a γ-Ni+γ'-Ni$_3$Al nickel aluminide alloy, wherein the environmental barrier layer is formed over the bond coat.

13. The system of claim 1, further comprising a thermal barrier coating (TBC) comprising zirconia or hafnia, wherein the environmental barrier coating is formed over the TBC.

14. The system of claim 1, further comprising a thermal barrier coating (TBC) comprising zirconia or hafnia, wherein the TBC is formed over the environmental barrier coating, and wherein the multilayer, porous abradable coating is formed over the TBC.

* * * * *